C. E. SMITH.
FEED DEVICE FOR BEAN PICKING MACHINES.
APPLICATION FILED JUNE 6, 1913.
1,096,399.
Patented May 12, 1914.
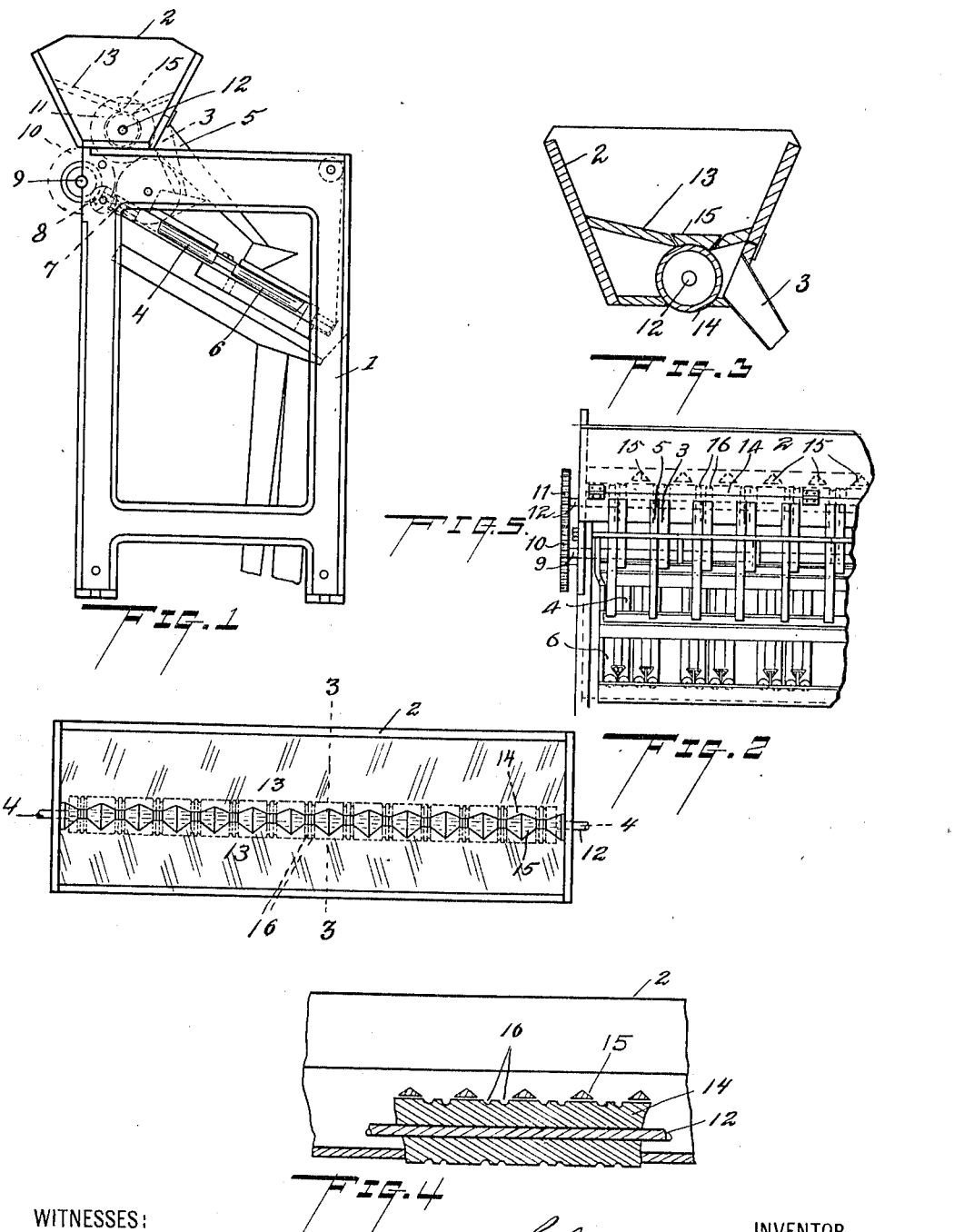
WITNESSES:
Roy Wallis
Nellie M. Angus
INVENTOR
Charles E. Smith
BY
Geo. B. Willcox
ATTORNEY

UNITED STATES PATENT OFFICE.

CHARLES E. SMITH, OF SAGINAW, MICHIGAN.

FEED DEVICE FOR BEAN-PICKING MACHINES.

1,096,399.  Specification of Letters Patent.  Patented May 12, 1914.

Application filed June 6, 1913. Serial No. 772,114.

*To all whom it may concern:*

Be it known that I, CHARLES E. SMITH, a citizen of the United States, residing at Saginaw, in the county of Saginaw and State of Michigan, have invented certain new and useful Improvements in Feed Devices for Bean-Picking Machines; and I do hereby declare the following to be a full, clear, and exact description of the invention, such as will enable others skilled in the art to which it appertains to make and use the same.

This invention relates to bean picking machines and pertains more particularly to that type of machine in which dry beans are deposited in a hopper and fed therefrom by means of a feed roll, into chutes that deliver the beans into a groove formed by the upper peripheries of picking rolls arranged in pairs side-by-side and inclined downwardly so that the split beans will be drawn down between the rolls while the whole beans pass lengthwise down the rolls, dropping off at the ends into a suitable receptacle.

My improvement relates more particularly to the construction and arrangement of the parts of the hopper and the feed rolls and to the means for distributing the beans from the feed rolls to the picking rolls to secure a steady and uniform flow of beans from the hopper to the picking rolls.

With these and certain other objects in view which will appear later in the specification, my invention consists in the devices described and claimed and the equivalents thereof.

In the drawings, Figure 1 is a side view of a bean picking machine embodying my improvement; Fig. 2 is a top plan view of the hopper and feeding roll; Fig. 3 is a transverse section of the hopper, the section being taken on the line 3—3 of Fig. 2; Fig. 4 is a part longitudinal section through the feeding roll, on the line 4—4 of Fig. 2. Fig. 5 is a partial front elevation showing the picking rolls, the lower portion of the hopper and the feed spouts leading to the rolls.

As is clearly shown in the drawings, the device consists in a frame 1 carrying a hopper 2, into which are placed the beans to be picked.

3 is one of a number of chutes leading from the hopper to the upper part of a pair of picking rolls 4.

5 is one of a number of longer chutes leading from the hopper to the upper ends of another pair of picking rolls 6. The picking rolls are driven in the usual manner, by gears 7, which are driven by beveled pinions 8, from the drive shaft 9, which is operated by any suitable source of power. At one end of the drive shaft 9 is a gear 10 meshing with a gear 11 on the feed roll shaft 12. Within the hopper 2 is an inclined bottom 13, the inner edges of which are beveled as shown in Fig. 3, and lie close to the upper periphery of the feed roll 14. Spanning the open space between two opposite edges of the inclined bottom 13 are bridge pieces 15, the upper edges of which are beveled, as shown in Fig. 4. The feed roll 14 is provided with pairs of peripheral grooves. The bridge pieces 15 overlie that part of the feed roll 14 between each pair of grooves. As roll 14 revolves, beans drop into the grooves 16 and are carried around to the mouths of the chutes 3 and 5 and are delivered respectively to the pairs of rolls 4 and 6. Preferably one groove of each pair of grooves 16 delivers to one chute as 3 and the other groove of the pair delivers to the other chute as 5. This arrangement permits each pair of grooves to supply two sets of picking rolls.

It will be noted that the feed roll 14 carries as many pairs of grooves 16 as there are pairs of picking rolls in the machine and that each groove is continuous around the periphery of the roll, and being of sufficient depth to receive a single bean, the beans are delivered to the spouts singly one after the other instead of in groups of two or three at a time. This single delivery, which is due to the construction of the grooves as just noted is a feature of importance in the art of picking beans. The efficiency of the picking rolls depends to a great degree upon securing intimate contact between the picking roll surfaces and each individual bean. In my improvement the beans are supplied singly one after the other and I thereby secure maximum efficiency of the picking rolls.

While I have shown and described my improved feed roll construction as employing grooves arranged in pairs, each groove of a pair supplying beans to one pair of picking rolls, it will be understood that a single groove or more than two grooves may be employed if it is desired to feed to a single pair of picking rolls or to more than two pairs.

Having described my invention, what I claim and desire to secure by Letters Patent is:

1. A feed device for bean picking machines, comprising a feed hopper; a revoluble feed roll therein, said feed roll formed with a plurality of continuous peripheral grooves; an inclined bottom in said hopper above said roll and having a longitudinal opening therein; beveled ridge pieces arranged across said opening and between the grooves of said roller, and chutes arranged to conduct beans from the respective grooves of the feed roll.

2. A feed device for bean picking machines, comprising a feed hopper; a revoluble feed roll therein, said feed roll formed with a plurality of continuous peripheral grooves, each groove being in depth substantially equal to the width of a bean; an inclined bottom in said hopper above said roll and having a longitudinal opening therein, the edges of said bottom being beveled and lying adjacent said roll; beveled bridge pieces arranged across said opening and between the grooves of said roller, and chutes arranged to conduct beans from the respective grooves of the feed roll.

In testimony whereof, I affix my signature in presence of two witnesses.

CHARLES E. SMITH.

Witnesses:
NELLIE M. ANGUS,
JOSEPH V. CARPENTER.

Copies of this patent may be obtained for five cents each, by addressing the "Commissioner of Patents, Washington, D. C."